United States Patent
Bennett et al.

(10) Patent No.: US 6,967,458 B1
(45) Date of Patent: Nov. 22, 2005

(54) DECREASING SPIN UP TIME IN A DISK DRIVE BY ADJUSTING A DUTY CYCLE OF A SPINDLE MOTOR PWM SIGNAL TO MAINTAIN CONSTANT AVERAGE INPUT CURRENT

(75) Inventors: George J. Bennett, Murrieta, CA (US); Robert P. Ryan, Mission Viejo, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 0 days.

(21) Appl. No.: 10/210,399

(22) Filed: Jul. 31, 2002

(51) Int. Cl.$^7$ .............................................. G05B 11/28
(52) U.S. Cl. ...................... 318/599; 318/254; 318/439; 318/811; 318/560
(58) Field of Search ................. 318/599, 685, 318/600–610, 638, 696, 700, 701, 254, 560, 318/439, 438, 139, 811; 360/78.12, 75, 67, 360/77.04, 78.09, 95, 114, 59, 46, 78.13; 388/829, 828, 811

(56) References Cited

U.S. PATENT DOCUMENTS

| | | | |
|---|---|---|---|
| 4,833,662 A * | 5/1989 | Yoda .......................... 369/13.3 |
| 4,851,755 A * | 7/1989 | Fincher ....................... 318/696 |
| 5,406,181 A | 4/1995 | Wakui |
| 5,422,760 A * | 6/1995 | Abbott et al. ................. 360/46 |
| 5,442,272 A | 8/1995 | Schwartz |
| 5,666,463 A | 9/1997 | Schwartz et al. |
| 5,821,717 A * | 10/1998 | Hassan et al. ............... 318/560 |
| 5,838,515 A * | 11/1998 | Mortazavi et al. ........ 360/78.12 |
| 5,859,518 A * | 1/1999 | Vitunic ........................ 318/701 |
| 5,898,283 A | 4/1999 | Bennett |
| 6,013,990 A | 1/2000 | Lee |
| 6,104,682 A * | 8/2000 | Konishi .................... 369/44.34 |
| 6,163,118 A * | 12/2000 | Chen et al. .................. 318/254 |
| 6,189,824 B1 * | 2/2001 | Stricker ....................... 242/357 |
| 6,285,149 B1 * | 9/2001 | Brenden et al. ............. 318/439 |
| 6,285,521 B1 * | 9/2001 | Hussein .................... 360/73.03 |
| 6,345,023 B1 * | 2/2002 | Fushimi et al. ........... 369/47.36 |
| 6,445,530 B1 * | 9/2002 | Baker ....................... 360/78.04 |
| 6,462,496 B1 * | 10/2002 | Hassan et al. ............... 318/560 |
| 6,476,580 B1 * | 11/2002 | Nakamiya et al. .......... 318/696 |
| 6,721,119 B1 * | 4/2004 | Hassan et al. ................. 360/75 |
| 2002/0027423 A1 * | 3/2002 | White ......................... 318/254 |

\* cited by examiner

Primary Examiner—Marlon T. Fletcher
Assistant Examiner—Renata McCloud
(74) Attorney, Agent, or Firm—Howard H. Sheerin, Esq.

(57) ABSTRACT

A disk drive is disclosed comprising a spindle motor for rotating a disk, wherein the current applied to the spindle motor is controlled by adjusting a duty cycle of a pulse width modulated (PWM) signal. A current sensor generates a current sense signal representing a current flowing from a supply voltage. The current sense signal is integrated to generate an integration signal. The integration signal is compared to a threshold, and the result of the comparison is used to adjust the duty cycle of the PWM signal. In this manner the disk drive draws essentially constant average input current from the supply voltage which decreases the spin up time of the disk.

18 Claims, 13 Drawing Sheets

DECREASING SPIN UP TIME IN A DISK DRIVE BY ADJUSTING A DUTY CYCLE OF A SPINDLE MOTOR PWM SIGNAL TO MAINTAIN CONSTANT AVERAGE INPUT CURRENT

CROSS REFERENCE TO RELATED APPLICATIONS AND PATENTS

This application is related to U.S. Pat. No. 5,898,283 entitled "VOLTAGE FEEDFORWARD CONTROL SYSTEM FOR A SPINDLE MOTOR OF A DISK DRIVE" issued on Apr. 27, 1999, the disclosures of which is incorporated herein by reference.

BACKGROUND OF THE INVENTION

1. Field of the Invention

The present invention relates to disk drives for computer systems. More particularly, the present invention relates to decreasing a spin up time for a disk drive by adjusting a duty cycle of a spindle motor PWM signal to maintain constant average input current.

2. Description of the Prior Art

The spindle motor of a disk drive is typically driven by a supply voltage provided by a host computer. The supply voltage is periodically applied to the windings of the spindle motor in a desired commutation sequence resulting in a rotational torque. During each commutation sequence, a selected winding is connected to the supply voltage through a pulse width modulated (PWM) control signal. A servo controller generates the PWM control signal having an adjustable duty cycle for controlling the desired torque of the spindle motor.

The disk drive must be designed to meet the current limitations of the supply voltage established by the vendor of the host computer, including the circuitry that drives the spindle motor. This is of particular concern during the start up process which requires more torque to spin the disk up to an operating speed. The prior art has suggested to monitor the peak current passing through the windings of the spindle motor in a current controlled feedback loop for controlling the speed of the spindle motor during spin up as well as during the normal, steady state operating mode of the disk drive. The prior art has also suggested to monitor the peak current in the windings of the spindle motor to current limit and thereby protect the driver circuitry. However, to ensure the supply voltage current limitations are not exceeded prior art disk drives are typically designed so that during the spin up process the spindle motor draws as little as 60% of the available current from the supply voltage. This increases the spin up time which is undesirable, particularly as the operating spin rate increases. The host computer typically imposes a constraint on the maximum spin up time before a time-out error is generated. Further, the increased spin up time increases head wear in disk drives that park the head on a landing zone of the disk.

U.S. Pat. No. 5,442,272 discloses to charge a capacitor prior to spinning un the disk and to discharge the current stored in the capacitor into the spindle motor windings during the spin up process in order to limit the amount of current drawn from the supply voltage. The capacitor must be large enough to store a sufficient amount of current to enable higher torque and faster spin up times. However, mounting a large, discrete capacitor on the printed circuit board assembly (PCBA) is undesirable. In addition, there is an undesirable delay associated with charging the capacitor prior to initiating the spin up process.

There is, therefore, a need to improve the spin up process for disk drives without exceeding the current limitations of the supply voltage.

SUMMARY OF THE INVENTION

The present invention may be regarded as a disk drive connectable to a host computer. The disk drive comprising a disk, a head actuated radially over the disk, and a spindle motor for rotating the disk, the spindle motor comprising a plurality of windings. The disk drive further comprises an interface for receiving a supply voltage from the host computer. A spindle driver applies a current from the supply voltage to the windings of the spindle motor in response to a pulse width modulated (PWM) signal. A first current sensor generates a first current sense signal representing a current flowing from the supply voltage. An integrator integrates the first current sense signal to generate an integration signal, wherein a duty cycle of the PWM signal is adjusted in response to the integration signal.

In one embodiment, the integration signal is compared to a predetermined threshold, wherein the duty cycle of the PWM signal is adjusted in response to the comparison.

In one embodiment, the integrator is reset at the start of each cycle of the PWM signal. In another embodiment, the duty cycle of the PWM signal is limited to a predetermined maximum.

In one embodiment, the integrator comprises a capacitor for integrating the first current sense signal.

In one embodiment, the first current sense signal is indicative of substantially all current flowing from the supply voltage. In one embodiment, the disk drive further comprises a second current sensor for generating a second current sense signal representing a current flowing through the windings. The second current sense signal is compared to a predetermined threshold, wherein the duty cycle of the PWM signal is adjusted in response to the comparison.

In another embodiment, the first current sense signal is indicative of current flowing through the windings of the spindle motor. In one embodiment, the first current sense signal is compared to a predetermined threshold, wherein the duty cycle of the PWM signal is adjusted in response to the comparison.

In one embodiment, a current controlled oscillator generates a periodic signal proportional to a magnitude of the first current sense signal. A counter counts cycles in the periodic signal to adjust the duty cycle of the PWM signal.

In yet another embodiment, a voltage sensor generates a voltage sense signal representing a voltage level of the supply voltage. The spindle driver is responsive to the first current sense signal to control the amount of current drawn by the windings from the supply voltage during a spin up mode of the disk drive. The spindle driver is responsive to the voltage sense signal to control the amount of current drawn by the windings from the supply voltage during a steady state mode of the disk drive. In one embodiment, the duty cycle of the PWM signal is adjusted in response to the voltage sense signal.

The present invention may also be regarded as a method of operating a disk drive connected to a host computer. The disk drive comprises a disk, a head actuated radially over the disk, and a spindle motor for rotating the disk, the spindle motor comprising a plurality of windings. A supply voltage is received from the host computer. A pulse width modulated (PWM) signal is generated, and current from the supply voltage is applied to the windings of the spindle motor in response to the PWM signal. A current flowing from the supply voltage is sensed to generate a first current sense signal. The current sense signal is integrated, and the integration used to adjust a duty cycle of the PWM signal.

DESCRIPTION OF THE PREFERRED EMBODIMENTS

Figure 1:
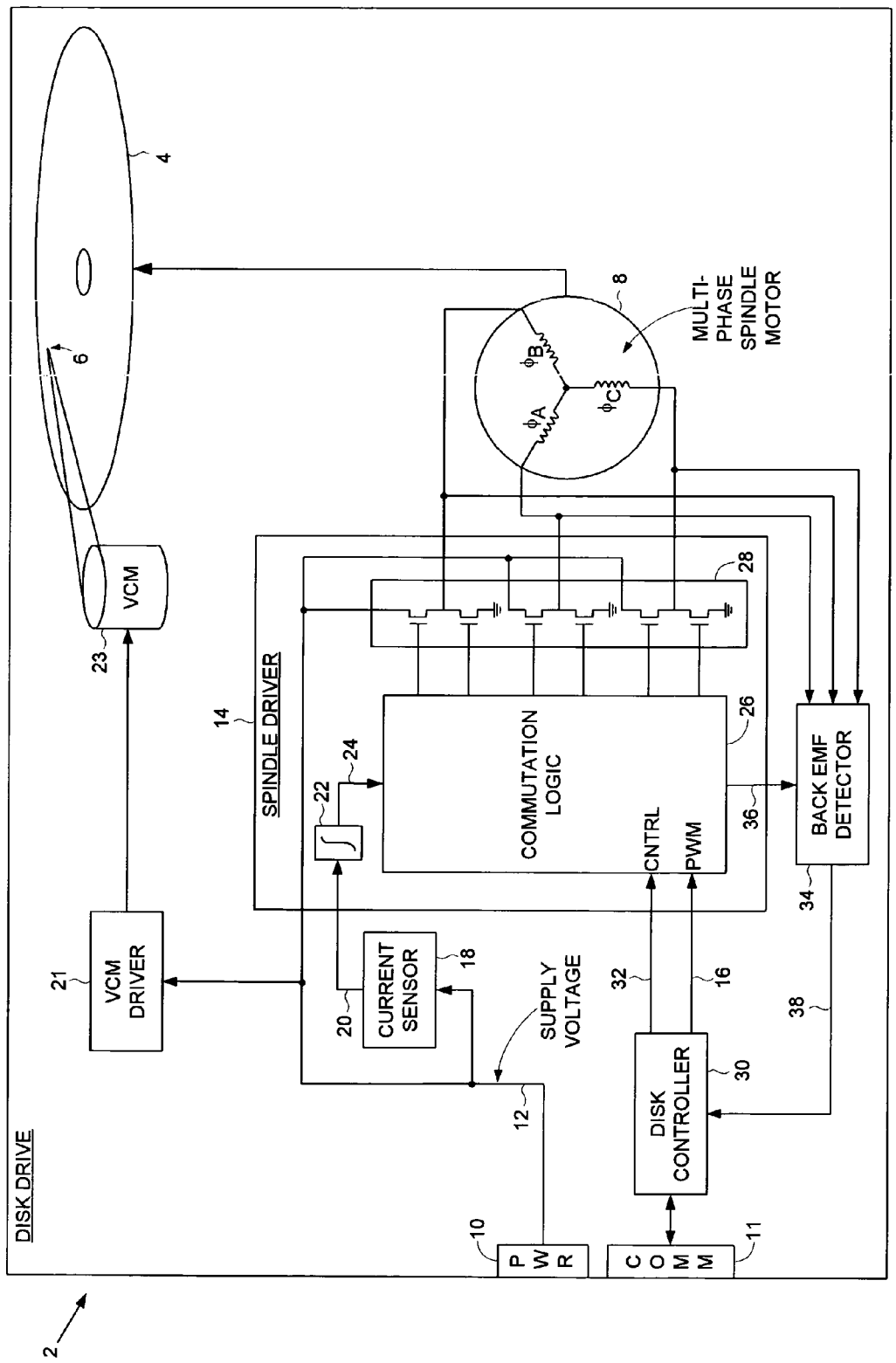
FIG. 1 snows a disk drive according to an embodiment of the present invention comprising an integrator for integrating a current sense signal in order to adjust a PWM signal for modulating the driving current of a spindle motor.

FIG. 1 shows a disk drive 2 connectable to a host computer according to an embodiment of the present invention. The disk drive 2 comprising a disk 4, a head 6 actuated radially over the disk 4, and a spindle motor 8 for rotating the disk 4, the spindle motor 8 comprising a plurality of windings (e.g., $\phi A$, $\phi B$, $\phi C$). The disk drive 2 further comprises an interface 10 for receiving a supply voltage 12 from the host computer. A spindle drive 14 applies a current from the supply voltage 12 to the windings of the spindle motor 8 in response to a pulse width modulated (PWM) signal 16. A first current sensor 18 generates a first current sense signal 20 representing a current flowing from the supply voltage 12. An integrator 22 integrates the first current sense signal 20 to generate an integration signal 24, wherein a duty cycle of the PWM signal 16 is adjusted in response to the integration signal 24.

In the embodiment of FIG. 1, the supply voltage 12 is applied to a VCM driver 21 of a voice coil motor (VCM) 23. When the disk controller 30 executes a read or write command applied to the VCM 23 (e.g., by pulse width modulating the supply voltage 12) in order to actuate the head 6 radially over the disk 4.

The spindle motor 8 in the embodiment of FIG. 1 comprises three windings ($\phi A$, $\phi B$, $\phi C$) corresponding to three phases. However, any suitable number of windings may be employed to implement any suitable multi-phase spindle motor. Further, any suitable commutation sequence may be employed to commutate the windings. In the embodiment of FIG. 1, the spindle driver 14 comprises commutation logic 26 for controlling switches 28 to commutate the windings of the spindle motor 8 in a two-phase, three-phase, or hybrid two-phase/three-phase mode. A disk controller 30 generates a control signal 32 and the PWM signal 16 applied to the spindle driver 14. The control signal 32 comprises control information (such as a starting state and a commutation clock), and the PWM signal 16 is used to modulate the driving current in the windings. The windings are connected to a back EMF detector 34 which detects threshold crossings (e.g., zero crossings) in the back EMF voltage generated by the windings. Since the back EMF voltage is distorted when current is flowing, the spindle driver 14 supplies a control signal 36 to the back EMF detector 34 identifying the "open" winding generating a valid back EMF signal. At each back EMF threshold crossing the back EMF detector 34 toggles a signal to generate a square wave signal 38. The frequency of the back EMF threshold crossings and thus the frequency of the square wave signal 38 represent the speed of the spindle motor 8. The disk controller 30 evaluates the square wave signal 38 and adjusts the PWM signal 16 in order to control the speed of the spindle motor 8. The disk controller 30 may be implemented as a single integrated circuit or multiple integrated circuits and may include a servo control microprocessor and a disk control microprocessor.

Figure 2A:
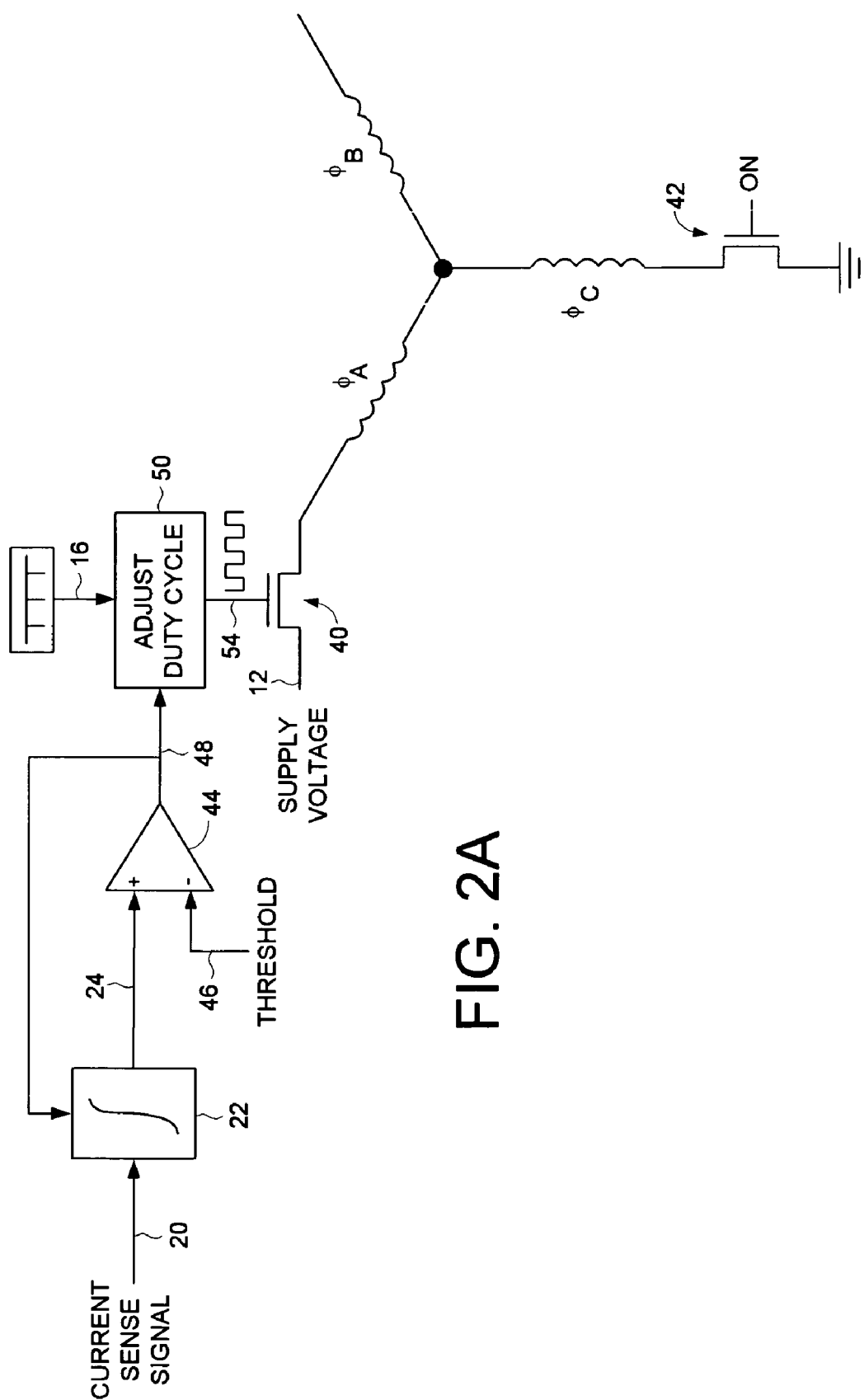
FIG. 2A shows an embodiment of the present invention wherein the duty cycle of the PWM signal is limited relative to when the integration exceeds a threshold.

During the spin up process, it is desirable to accelerate the spindle motor as fast as possible without exceeding the current limitations imposed by the host on the supply voltage 12. Referring to FIG. 2A which shows a commutation state of the spindle motor 8, the disk controller 30 generates the PWM signal 16 with a duty cycle of 100% (a pulse train) to command maximum torque. Switches 40 and 42 are turned on so that windings $\phi A$ and $\phi C$ draw current from the supply voltage 12. The integrator 22 integrate the first current sense signal 20 to generate the integration signal 24. The integration signal 24 is compared by comparator 44 to a predetermined threshold 46. When the integration signal 24 exceeds the threshold 46, a signal 48 resets the integrator 22 and adjusts the duty cycle of the PWM signal 16 through circuitry 50 by turning off switch 40 (e.g., through an AND gate). The resulting PWM signal 54 having an adjusted duty cycle modulates the operation of switch 40 so that the disk drive 2 draws essentially constant average input current from the supply voltage 12. In effect, the integrator 22 adjusts the duty cycle of the PWM signal 54 in order to maintain a constant average input current over each PWM cycle.

Figure 2B:
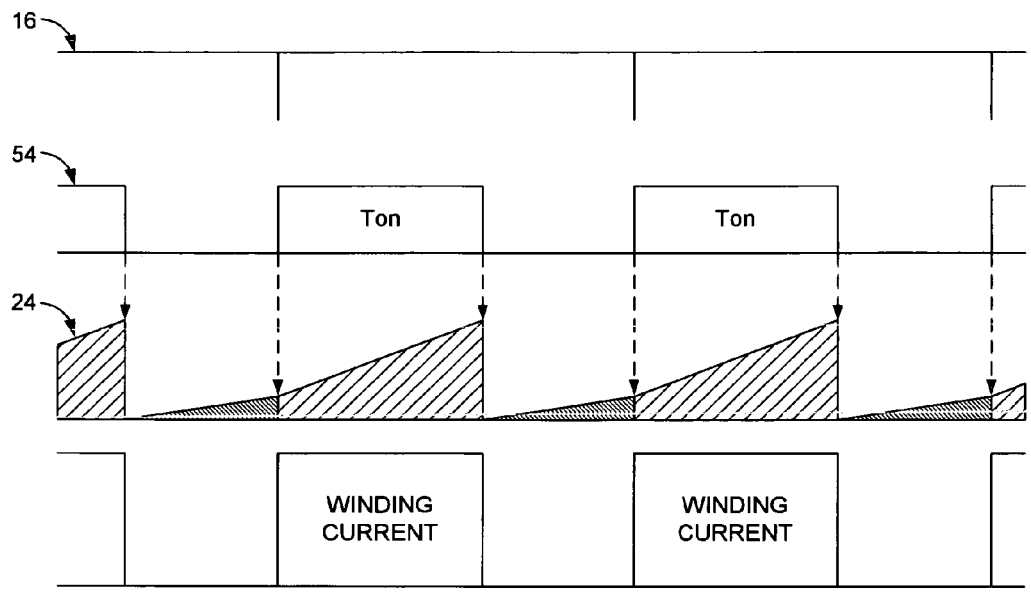
FIG. 2B is a timing diagram illustrating how the circuitry of FIG. 2A decreases the duty cycle of the PWM signal during the beginning of the spin up process when the back EMF voltage in the windings of the spindle motor is relatively low and the peak current drawn from the supply voltage is relatively high.

FIG. 2B is a timing diagram illustrating how the circuitry of FIG. 2A adjusts the duty cycle of the PWM signal 54 during the spin up process. At the end of each Ton period of the PWM signal 54 the integrator 22 is reset (signal 24 is reset) and begins to integrate the current drawn from the supply voltage 12 by other components of the disk drive (e.g., the VCM driver 21). At the beginning of the Ton period of the PWM signal 54 the current drawn by the spindle motor 12 is included in the current integrated by integrator 22. The Ton period of PWM signal 54 ends when the integration signal 24 exceeds the threshold 46.

Figure 2C:
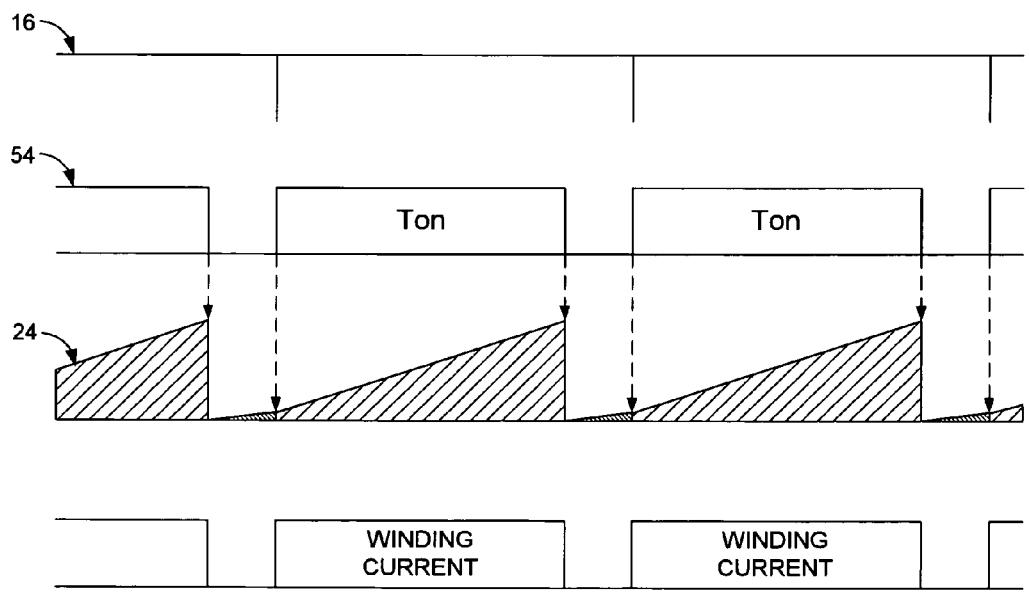
FIG. 2C is a timing diagram illustrating how the circuitry of FIG. 2A increases the duty cycle of the PWM signal later in the spin up process after the back EMF voltage in the windings of the spindle motor has increased and the peak current drawn from the supply voltage has decreased.

At the beginning of the spin up process the back EMF voltage in the windings of the spindle motor 8 is relatively low and the peak current drawn by the windings of the spindle motor 8 is relatively high as illustrated in FIG. 2B. Therefore the duty cycle (Ton period) of the PWM signal 54 is decreased by the integrator 22. Later in the spin up process the back EMF voltage in the windings of the spindle motor 8 increases thereby lowering the peak current drawn by the windings of the spindle motor 8 as shown in FIG. 2C. Therefore the duty cycle (Ton period) of the PWM signal 54 is increased by the integrator 22 to maintain essentially constant average input current drawn from the supply voltage 12 over each PWM cycle. If during the spin up process other components of the disk drive 2 suddenly draw more current from the supply voltage 12 (e.g., if the head 6 is unlatched during the spin up process) the duty cycle of the PWM signal 54 is adjusted (decreased) by the integrator 22 to maintain constant average input current over each PWM cycle. Therefore the spindle motor current is automatically adjusted to compensate not only for its own current, but for all the other circuits in the disk drive which draw current from the supply voltage 12, thus maintaining the total current at a desired value. This avoids exceeding the current limitations of the supply voltage 12 while ensuring the spindle motor 8 is driven with the maximum available current during the spin up process.

Figure 3:
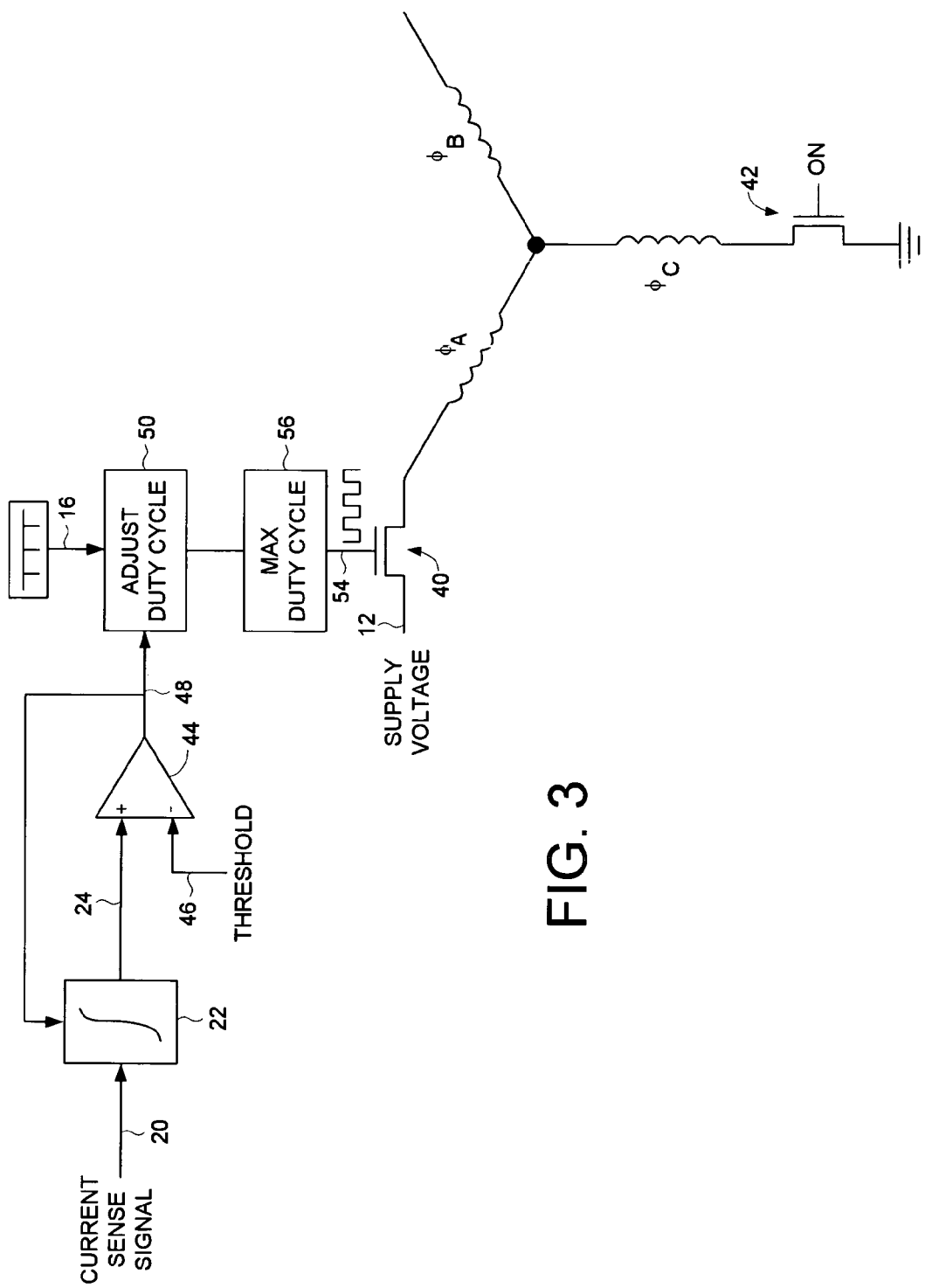
FIG. 3 shows an embodiment further comprising circuitry for limiting the maximum duty cycle of the PWM signal.

In an embodiment shown in FIG. 3, circuitry 56 is included for limiting the maximum duty cycle of the PWM signal 54 (e.g., to 97%). Limiting the maximum duty cycle of the PWM signal 54 increases loop stability at high duty cycles by preventing subharmonic cycling since each PWM period is forced to end.

Figure 4:
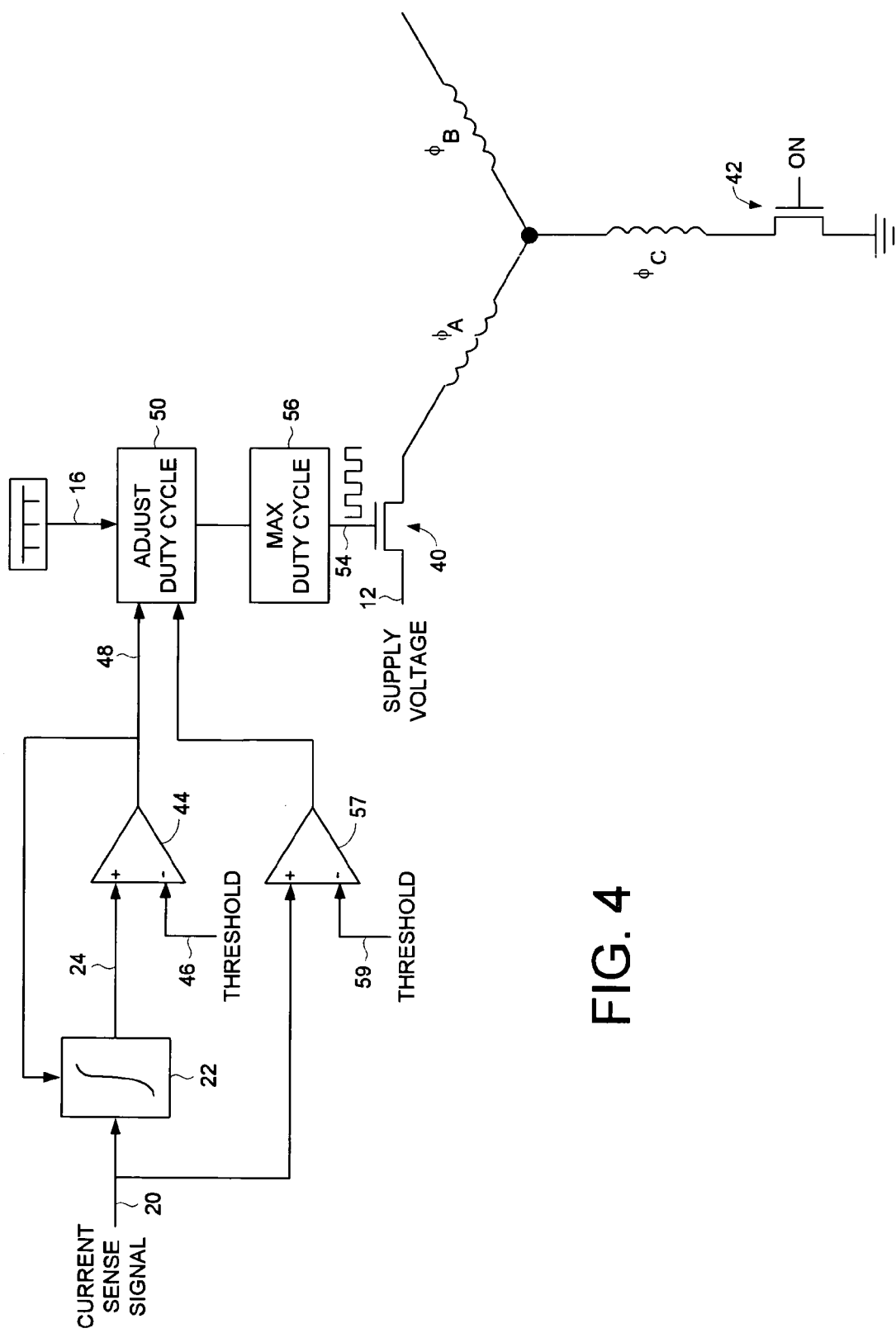
FIG. 4 shows an embodiment of the present invention wherein the duty cycle of the PWM signal is limited relative to when the current sense signal exceeds a threshold.

In an embodiment shown in FIG. 4, the disk drive 2 further comprises a comparator 57 for comparing the first current sense signal 20 to a predetermined threshold 59, wherein the duty cycle of the PWM signal 54 is adjusted in response to an output of the comparator 57. In one embodiment, the duty cycle of the PWM signal 54 is limited relative to when the first current sense signal 20 exceeds the predetermined threshold 59.

Figure 5:
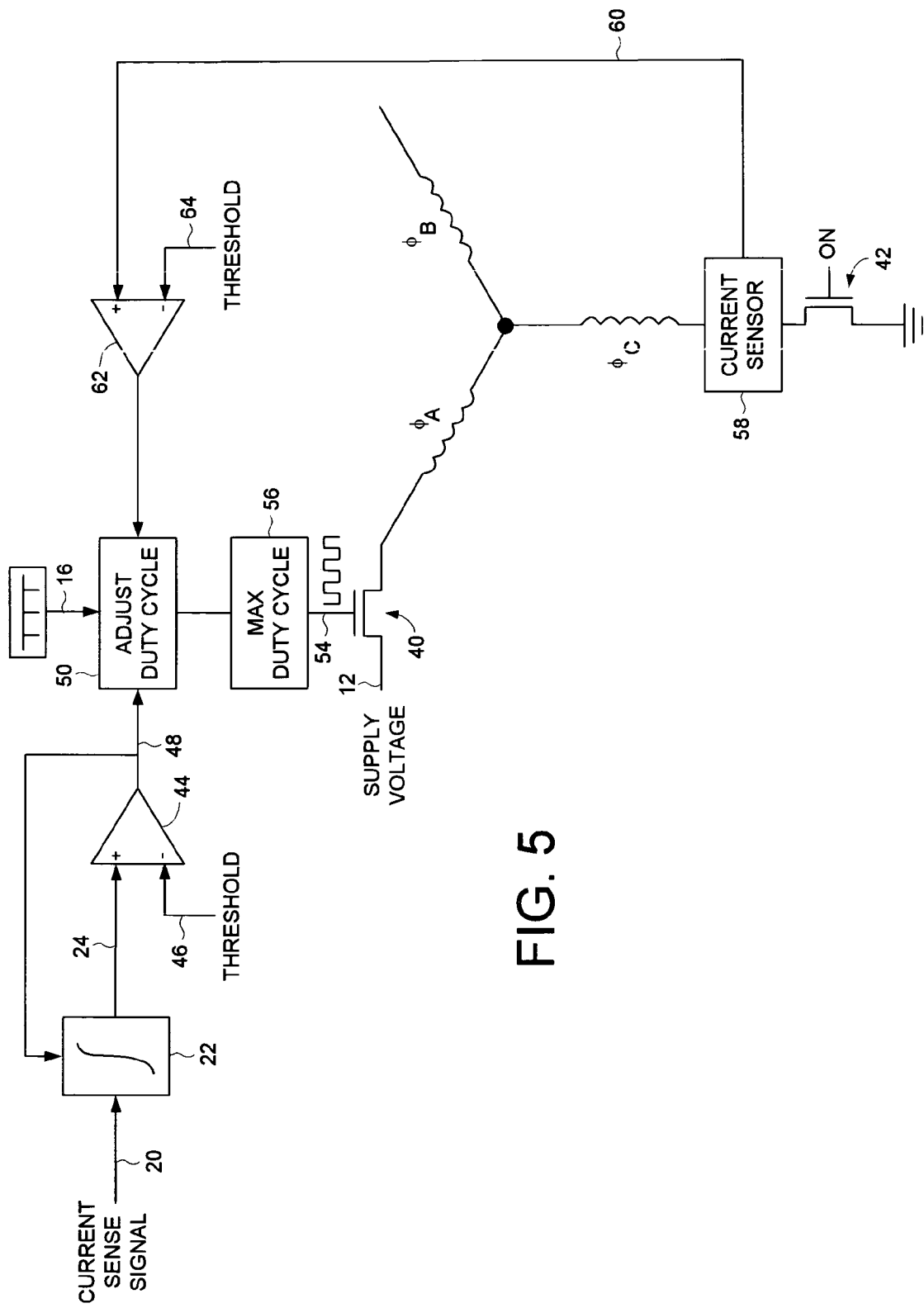
FIG. 5 shows an embodiment wherein the duty cycle of the PWM signal is limited relative to when the current in the windings of the spindle motor exceeds a threshold.

FIG. 5 shows an embodiment of the present invention wherein the disk drive 2 further comprises a second current sensor 58 for generating a second current sense signal 60 representing a current flowing through the windings of the spindle motor 8. A comparator 62 compares the second current sense signal 60 to a predetermined threshold 64, wherein the duty cycle of the PWM signal 54 is adjusted in response to an output of the comparator 62. In one embodiment when the second current sense signal 60 exceeds the threshold 64, switch 40 is turned off to limit the maximum current flowing through the windings to prevent damaging the windings as well as the spindle driver 14.

In the embodiment of FIG. 1, the current sensor 18 may sense the current on the high side of the supply voltage 12 or alternatively, the current sensor 18 may sense the current on the low side (ground) of the supply voltage 12. In an alternative embodiment shown in FIG. 6A, a current sensor 58 senses the current in the windings of the spindle motor 8 to implement a conventional current controlled feedback loop as well as current limit and thereby protect the spindle driver 14. If during the spin up process other components in the disk drive 2 draw essentially no current from the supply voltage 12, then the current drawn by the spindle motor 8 represents essentially all of the current drawn from the supply voltage 12. Therefore current sensor 58 can be advantageously used to generate the first current sense signal 20 applied to the integrator 22 as well as the second comparator 57. In this embodiment the integrator 22 is reset by control signal 52 at the beginning of each PWM cycle (on each pulse of signal 16) at the beginning of the Ton period instead of at the end of the Ton period as in the embodiment of FIG. 2A.

Figure 6A:
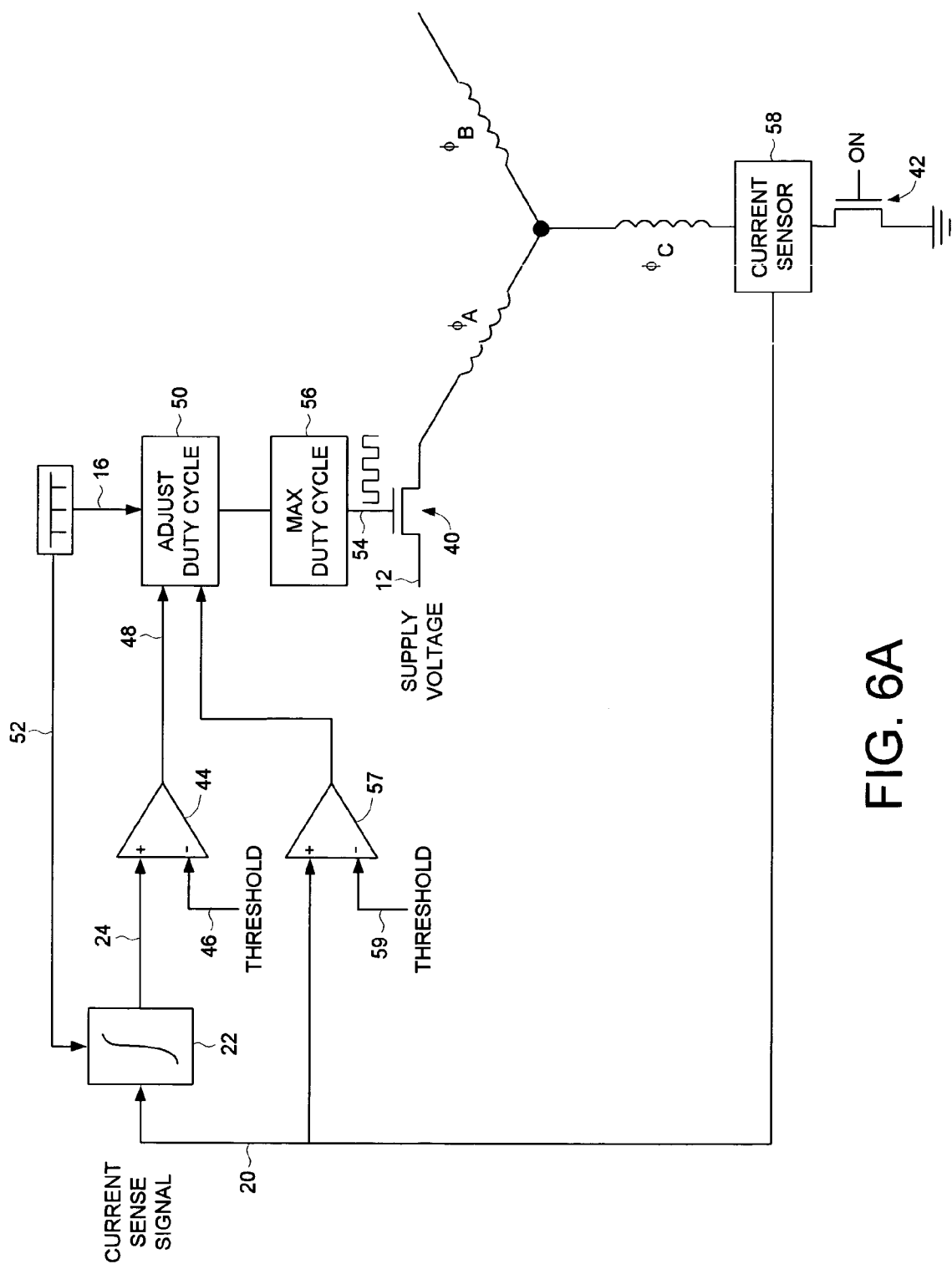
FIG. 6A shows an embodiment of the present invention wherein the current sense signal represents the current flowing through the windings of the spindle motor.
Figure 6B:
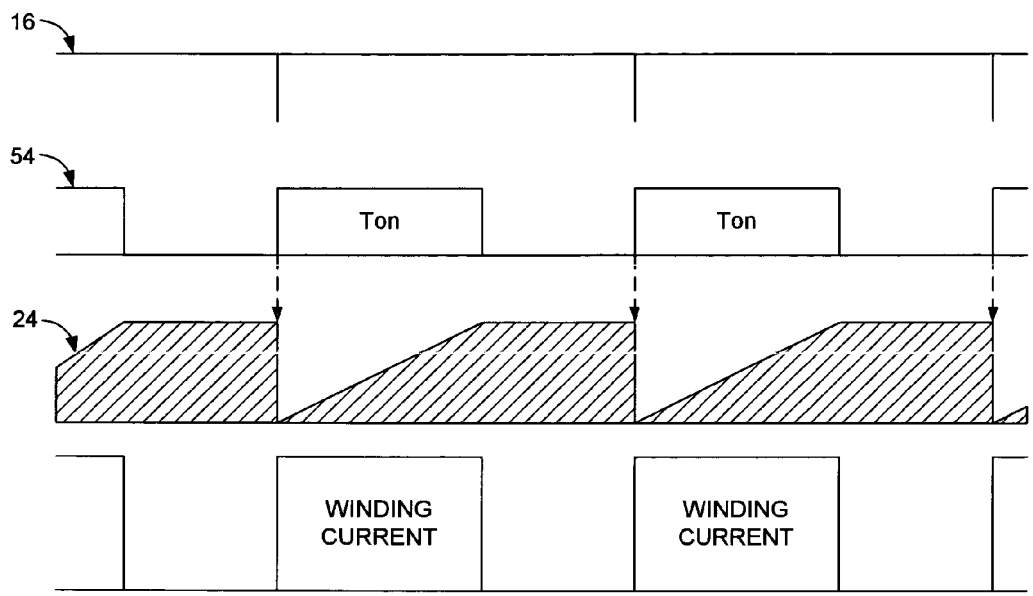
FIG. 6B is a timing diagram illustrating how the circuitry of FIG. 6A decreases the duty cycle of the PWM signal during the beginning of the spin up process when the back EMF voltage in the windings of the spindle motor is relatively low and the peak current drawn from the supply voltage is relatively high.
Figure 6C:
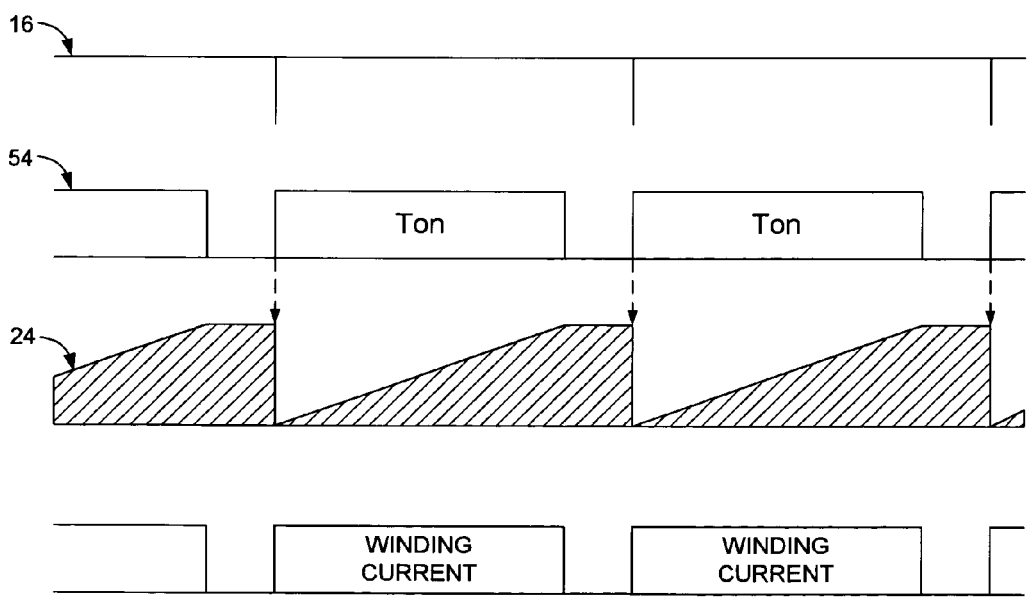
FIG. 6C is a timing diagram illustrating how the circuitry of FIG. 6A increases the duty cycle of the PWM signal later in the spin up process after the back EMF voltage in the windings of the spindle motor has increased and the peak current drawn from the supply voltage has decreased.

FIG. 6B is a timing diagram illustrating how the circuitry of FIG. 6A decreases the duty cycle of the PWM signal 54 during the beginning of the spin up process when the back EMF voltage in the windings of the spindle motor 8 is relatively low and the peak current drawn from the supply voltage 12 is relatively high. FIG. 6C is a timing diagram illustrating how the circuitry of FIG. 6A increases the duty cycle of the PWM signal 54 later in the spin up process after the back EMF voltage in the windings of the spindle motor 8 has increased and the peak current drawn from the supply voltage 12 has decreased.

Figure 7A:
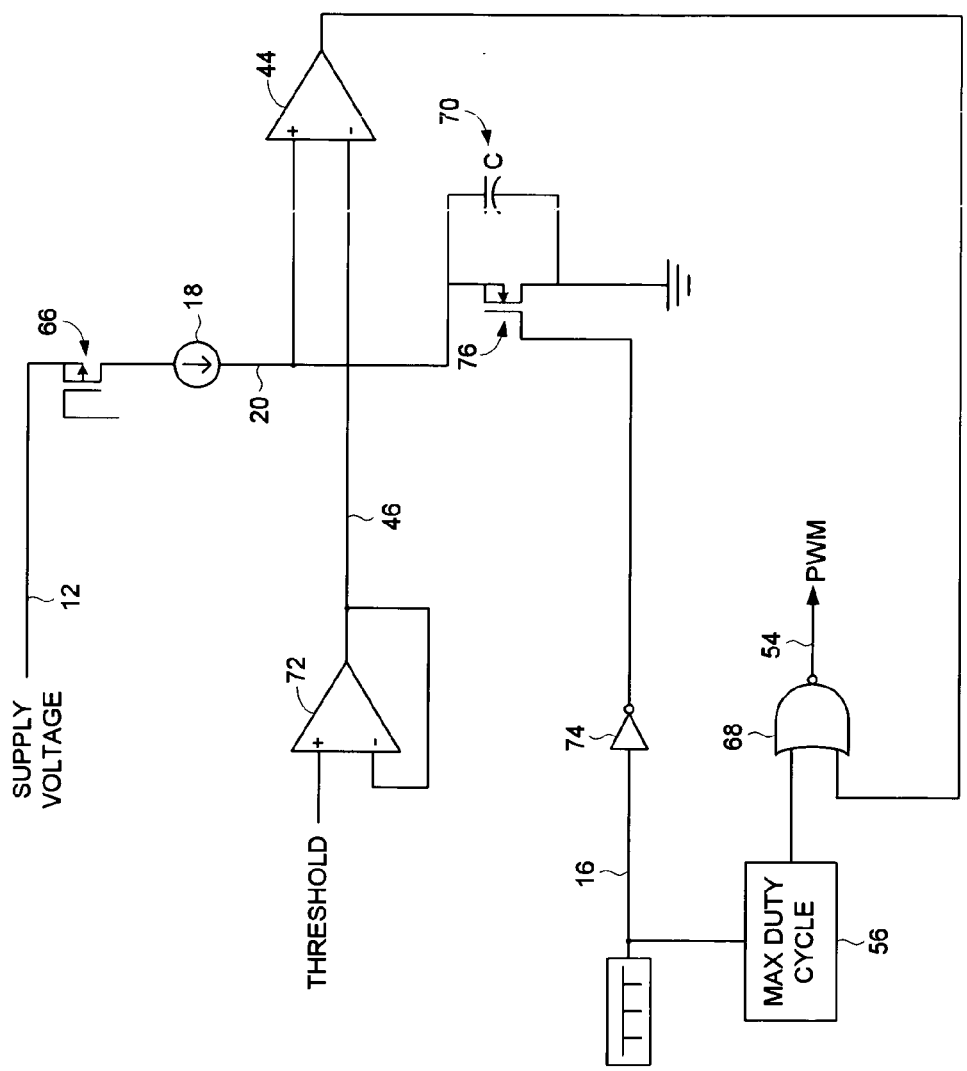
FIG. 7A shows details of a specific embodiment of the present invention wherein the integrator comprises a capacitor and the current sense signal represents the total current flowing from the supply voltage.

FIG. 7A shows an embodiment of the present invention for implementing the circuitry of FIG. 6A in the analog domain. Switch 66 connects the supply voltage 12 to circuitry for generating the PWM signal 54. When switch 66 is turned on, the PWM signal 54 is set high through NOR gate 68. A current sensor 18 generates the first current sense signal 20 which is integrated by a capacitor 70. An amplifier 72 establishes the threshold 46, and comparator 44 compares the voltage across the capacitor 70 to the threshold 46. When the voltage across the capacitor 70 exceeds the threshold 46, the PWM signal 54 is set low through NOR gate 68. At each low pulse of the pulse train 16 the capacitor 70 is discharged by inverter 74 turning on switch 76. With the capacitor 70 discharged the output of comparator 44 is low thereby setting the PWM signal 54 high to reset the cycle. Each low pulse of the pulse train 16 also resets the max duty cycle circuitry 56. In one embodiment, the max duty cycle circuitry 56 comprises a one-shot circuit programmed to fire at 97% of the duty cycle of the pulse train 16. If the one shot fires while the PWM signal 54 is still high, the PWM signal 54 is forced low through NOR gate 68, thereby limiting the maximum duty cycle of the PWM signal 54 to 97% of the duty cycle of the pulse train 16.

Figure 7B:
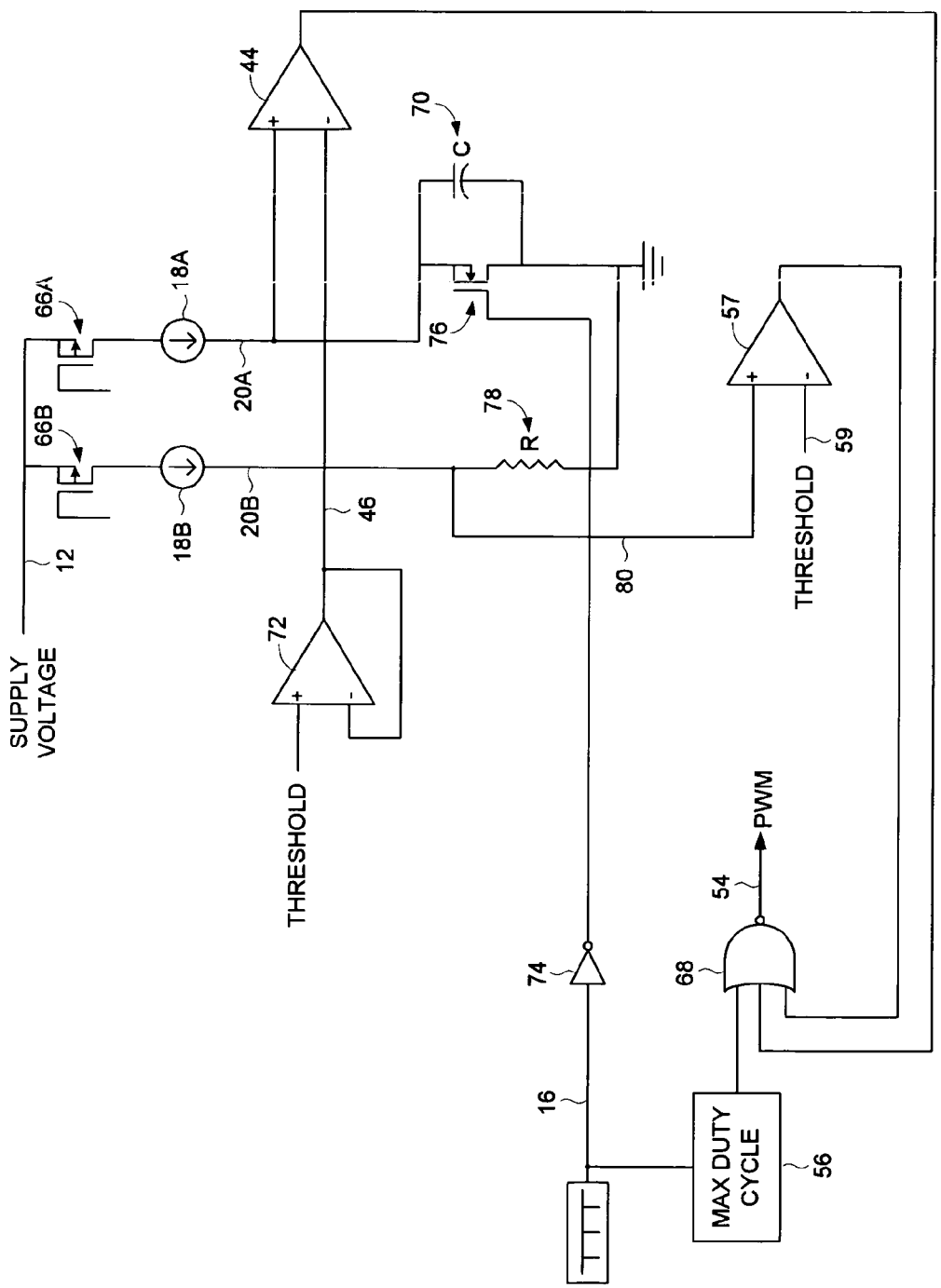
FIG. 7B shows an embodiment of the present invention wherein the duty cycle of the PWM signal is limited relative to when the current sense signal exceeds a threshold.

FIG. 7B shows implementation details for limiting the duty cycle of the PWM signal 54 if the first current sense signal 20B exceeds a threshold 59. A resistor 78 converts the first current sense signal 20B into a voltage 80 compared to the threshold 59 by comparator 57. If the first current sense signal 20B exceeds the threshold 59, the PWM signal 54 is forced low through NOR gate 68.

Figure 8A:
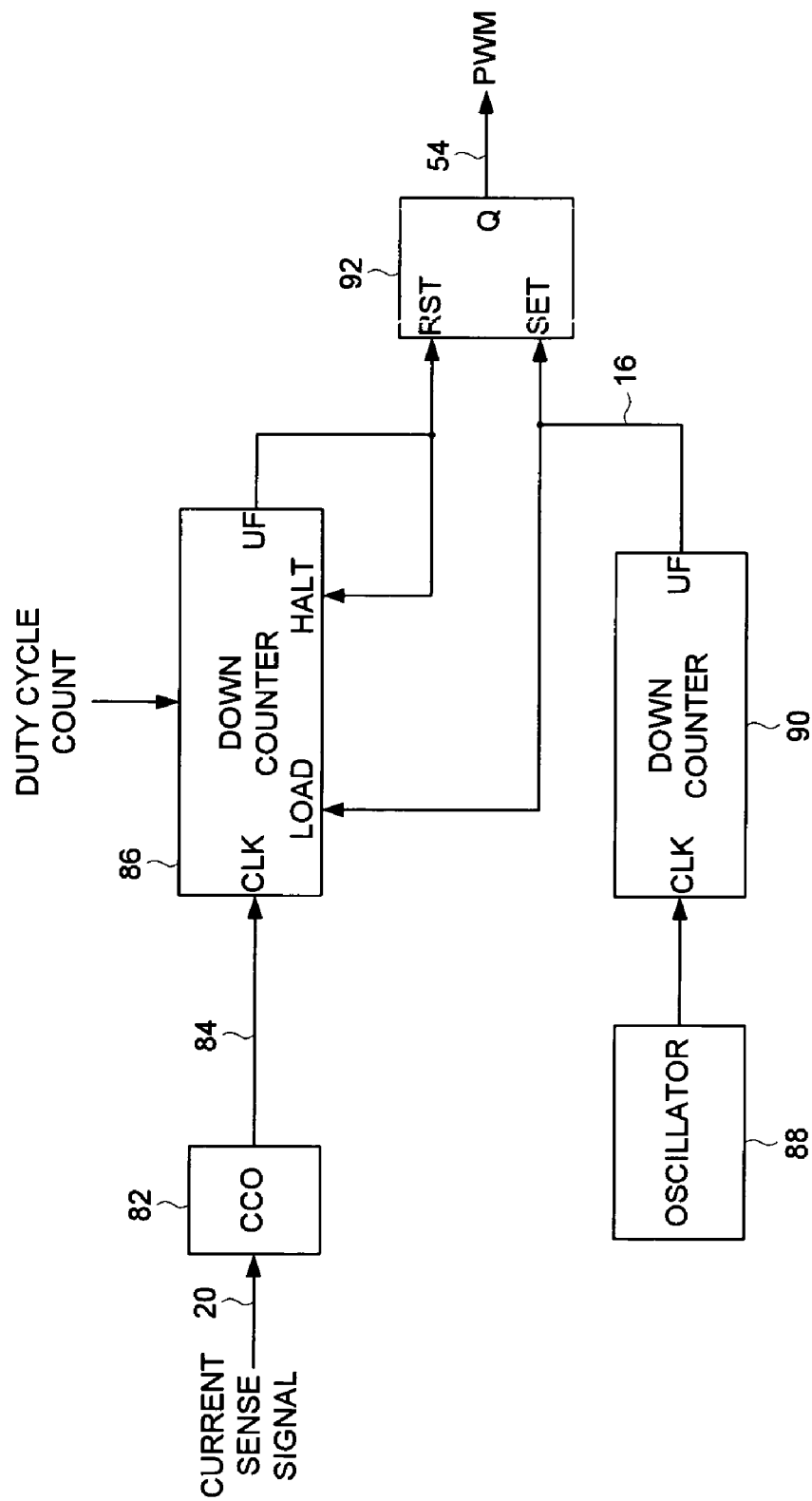
FIG. 8A shows an embodiment of the present invention wherein the integrator is implemented with digital circuitry including a current controlled oscillator and counters.

FIG. 8A shows an embodiment of the present invention for implementing the circuitry of FIG. 6A in the digital domain. The first current sense signal 20 is input into a current controlled oscillator (CCO) 82 to generate a periodic signal 84 having a frequency proportional to the magnitude of the first current sense signal 20. The periodic signal 84 drives the clock input of a counter 86 which is loaded with a duty cycle count. An oscillator 88 and counter 90 generate the pulse train signal 16. At each pulse cycle, the counter 90 sets a register 92 high, the output of which is the PWM signal 54, and loads counter 86 with the duty cycle count value. When counter 86 decrements to zero (underflows), the register 92 is reset to set the PWM signal 54 low. In this manner, counter 86 effectively integrates the first current sense signal 20 similar to the capacitor 70 of FIG. 7A.

Figure 8B:
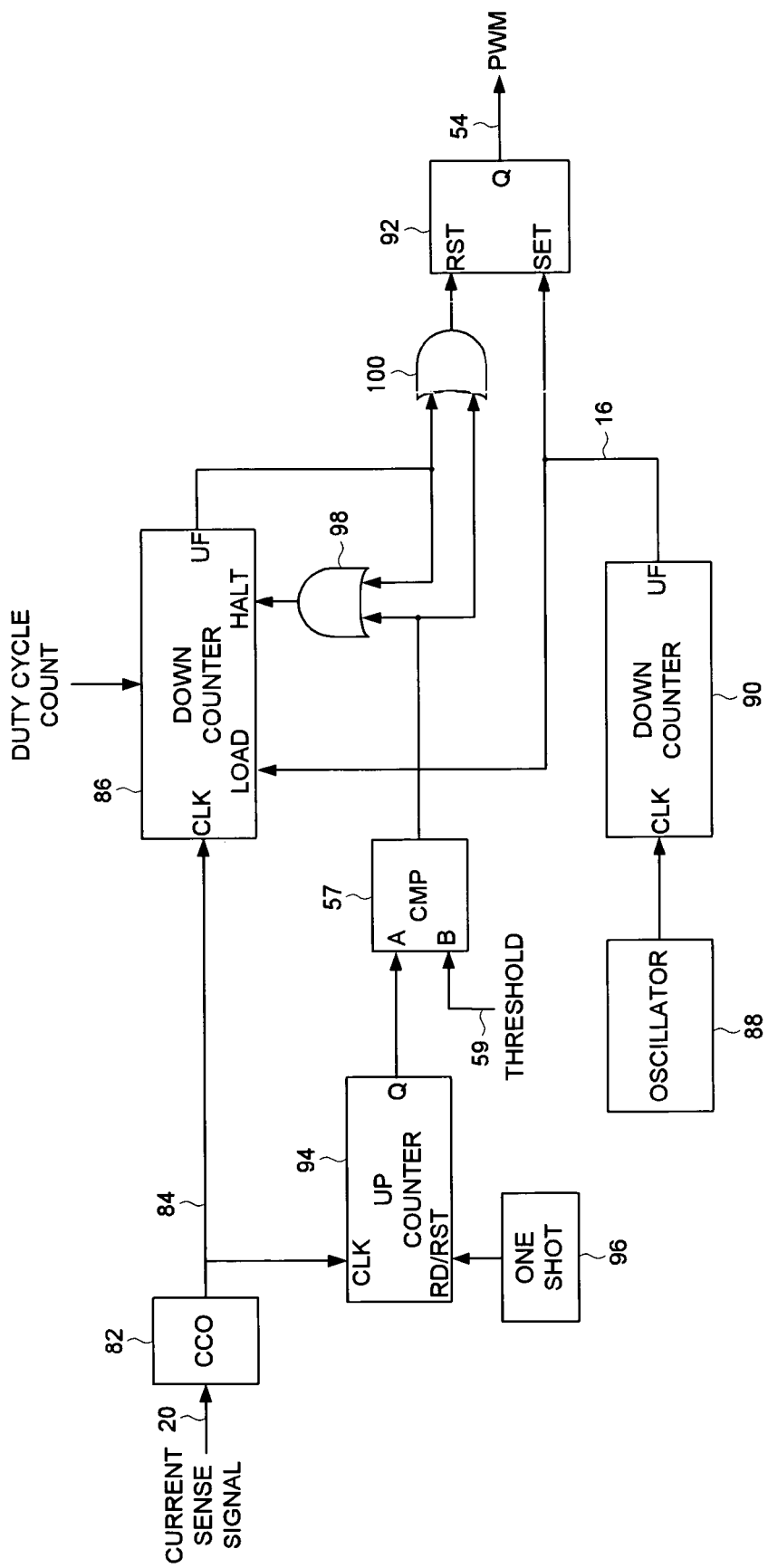
FIG. 8B shows an embodiment of the present invention for implementing the current threshold detector with digital circuitry.

FIG. 8B shows implementation details for limiting the duty cycle of the PWM signal 54 if the first current sense signal 20 exceeds a threshold 59. The periodic signal 84 generated by the CCO 82 drives the clock of counter 94. A one-shot circuit 96 is programmed to fire at a predetermined interval at which times the counter 94 output value is compared to a threshold 59 by comparator 57 and the counter 94 is reset. If when the one-shot 96 fires the counter 94 output value exceeds the threshold 59, the duty cycle counter 86 is halted through OR gate 98 and the register 92 is reset through OR gate 100 to set the PWM signal 54 to low.

Fluctuations in the magnitude of the supply voltage 12 will cause fluctuations in the spindle motor speed when driven with constant average input current. Fluctuations in the spindle motor speed do not adversely affect performance during the spin up process since the goal is simply to spin the disk 4 up to an operating speed. However, once the disk 4 reaches its steady state operating speed, it is important to spin the disk 4 at a nearly constant angular velocity so as not to adversely affect the normal operating mode of the disk drive while writing data to and reading data from the disk 4. Therefore in one embodiment the spindle driver 14 is responsive to the first current sense signal 20 to control the amount of current drawn by the windings from the supply voltage 12 during a spin up mode of the disk drive 2, and the spindle driver 14 is responsive to a voltage sense signal to control the amount of current drawn by the windings from the supply voltage 12 during a steady state mode of the disk drive 2.

Figure 9:
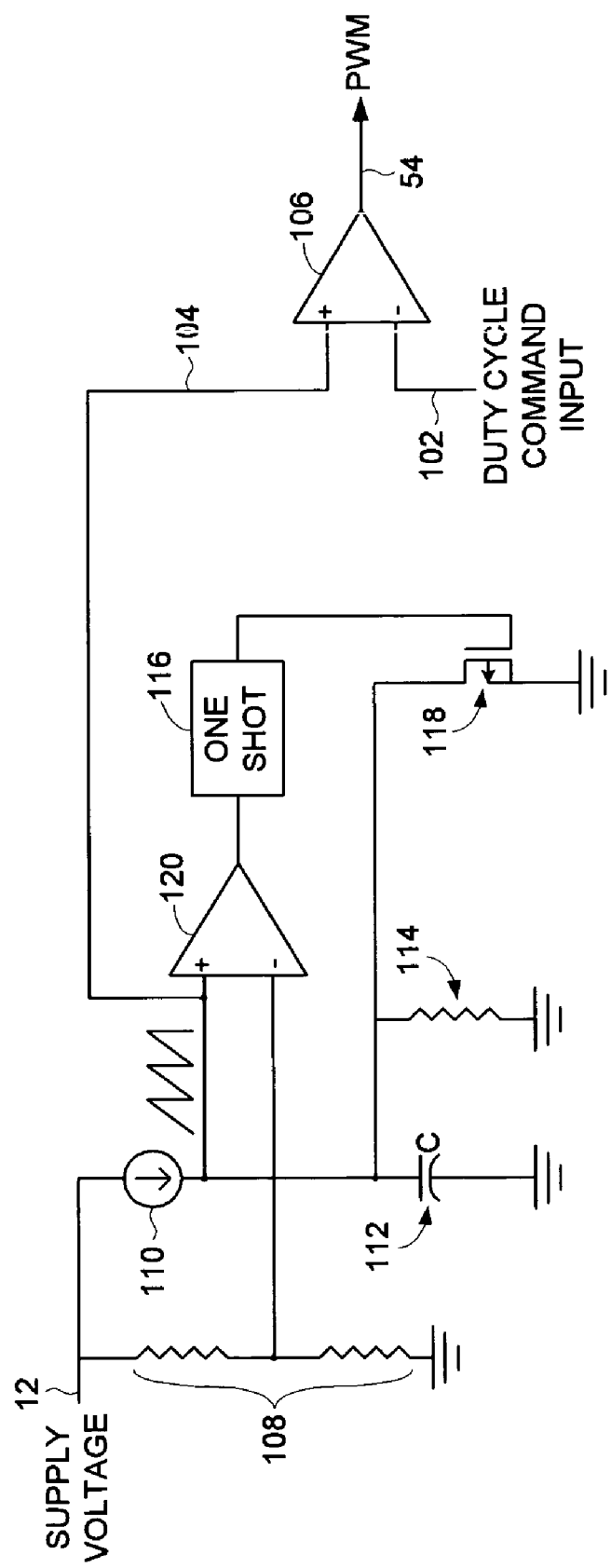
FIG. 9 shows an embodiment of the present invention wherein the duty cycle of the PWM signal is adjusted relative to a voltage sense signal during a steady state mode of the disk drive.

FIG. 9 shows an embodiment of the present invention for generating a voltage sense signal for use in controlling the spindle motor speed during the steady state mode of the disk drive 2. The disk controller 30 of FIG. 1 generates a duty cycle command input 102 for controlling the duty cycle of PWM signal 54 relative to the desired speed of the spindle motor 8. The duty cycle command input 102 is compared to a ramped sawtooth waveform 104 at comparator 106. The ramped sawtooth waveform 104 is generated by a combination of a resistive ladder 108, a current source 110, a capacitor 112, a resistor 114, a one-shot circuit 116, a FET 118, and a second comparator 120. The current generated by the current source 110 is proportional to the magnitude of the supply voltage 12. The current generated by the current source 110 is used as a reference current for generating a chop frequency. The current charges the capacitor 112. When the voltage on the capacitor 112 reaches a certain percentage (e.g., 50%) of the supply voltage 12 (as set by the resistive ladder 108), the second comparator 120 turns on the one-shot 116, which generates a pulse causing the capacitor 112 to discharge through the FET 118. The frequency of the ramped sawtooth waveform 104 is established by the capacitor 112 and the resistor 114. Peak amplitude of the sawtooth waveform is proportional to the magnitude of the supply voltage 12. An increase in the supply voltage 12 will cause an increase in the peak amplitude of the sawtooth waveform, and a decrease in the supply voltage 12 will cause a decrease in the peak amplitude of the sawtooth waveform.

Comparator 106 compares the sawtooth waveform to the duty cycle command input 102 which represents the average spindle motor voltage. The output of the comparator 106 is the PWM signal 54 having a varying duty cycle that compensates for variations in the magnitude of the supply voltage 12. Operation of FIG. 9 is described by the following equation:

$$Ton/T = Vdc/KVpwr$$

where Ton is the on-time of the PWM signal 54, time T is the period of the sawtooth waveform, voltage Vdc is the duty cycle command input, and voltage Vpwr is the peak amplitude of the sawtooth waveform. An increase in the peak amplitude of the sawtooth waveform will result in a decrease in the duty cycle of the PWM signal 54, and a decrease in the peak amplitude of the sawtooth waveform will result in an increase in the duty cycle of the PWM signal 54. Further details of this embodiment are disclosed in the above referenced U.S. patent entitled "VOLTAGE FEEDFORWARD CONTROL SYSTEM FOR A SPINDLE MOTOR OF A DISK DRIVE".

What is claimed is:

1. A disk drive connectable to a host computer, the disk drive comprising:
   (a) a disk;
   (b) a head;
   (c) a voice coil motor (VCM) for actuating the head over the disk;
   (d) a spindle motor for rotating the disk, the spindle motor comprising a plurality of windings;
   (e) an interface for receiving a supply voltage from the host computer;
   (f) a spindle driver for applying a current from the supply voltage to the windings of the spindle motor in response to a pulse width modulated (PWM) signal;
   (g) a current sensor for generating a current sense signal representing a current flowing from the supply voltage through at least the VCM and the windings of the spindle motor;
   (h) an integrator for integrating the current sense signal to generate an integration signal; and
   (i) a comparator for comparing the integration signal to a predetermined threshold, wherein an output of the comparator adjusts a duty cycle of the PWM signal.

2. The disk drive as recited in claim 1, wherein the integrator is reset at the end of the on-period of the PWM signal.

3. The disk drive as recited in claim 1, further comprising circuitry for limiting the duty cycle of the PWM signal to a predetermined maximum.

4. The disk drive as recited in claim 1, wherein the integrator comprises a capacitor for integrating the current sense signal.

5. The disk drive as recited in claim 1, wherein the current sense signal is indicative of substantially all current flowing from the supply voltage.

6. The disk drive as recited in claim 1, further comprising a comparator for comparing the current sense signal to a predetermined threshold, wherein the duty cycle of the PWM signal is adjusted in response to an output of the comparator.

7. The disk drive as recited in claim 1, wherein the integrator comprises:
(a) a current controlled oscillator for generating a periodic signal proportional to a magnitude of the current sense signal; and
(b) a counter responsive to the periodic signal, wherein an output of the counter adjusts the duty cycle of the PWM signal.

8. The disk drive as recited in claim 1, further comprising a voltage sensor for generating a voltage sense signal representing a voltage level of the supply voltage, wherein:
(a) the spindle driver is responsive to the current sense signal to control the amount of current drawn by the windings from the supply voltage during a spin up mode of the disk drive; and
(b) the spindle driver is responsive to the voltage sense signal to control the amount of current drawn by the windings from the supply voltage during a steady state mode of the disk drive.

9. The disk drive as recited in claim 8, wherein a duty cycle of the PWM signal is adjusted in response to the voltage sense signal.

10. A method of operating a disk drive connected to a host computer, the disk drive comprising a disk, a head, a voice coil motor (VCM) for actuating the head over the disk, and a spindle motor for rotating the disk, the spindle motor comprising a plurality of windings, the method comprising the steps of:
(a) receiving a supply voltage from the host computer;
(b) generating a pulse width modulated (PWM) signal;
(c) applying a current from the supply voltage to the windings of the spindle motor in response to the PWM signal;
(d) sensing a current flowing from the supply voltage through at least the VCM and the windings of the spindle motor to generate a current sense signal;
(e) integrating the current sense signal to generate an integration signal;
(f) comparing the integration signal to a predetermined threshold; and
(g) adjusting a duty cycle of the PWM signal in response to the comparison.

11. The method as recited in claim 10, further comprising the step of resetting the integration at the end of the on-period of the PWM signal.

12. The method as recited in claim 10, further comprising the step of limiting the duty cycle of the PWM signal to a predetermined maximum.

13. The method as recited in claim 10, wherein the step of integrating uses a capacitor for integrating the current sense signal.

14. The method as recited in claim 10, wherein the current sense signal is indicative of substantially all current flowing from the supply voltage.

15. The method as recited in claim 10, further the steps of:
(a) comparing the current sense signal to a predetermined threshold; and
(b) adjusting the duty cycle of the PWM signal in response to the comparison.

16. The method as recited in claim 10, wherein the step of integrating comprises the steps of:
(a) generating a periodic signal proportional to a magnitude of the current sense signal;
(b) counting cycles of the periodic signal; and
(c) adjusting the duty cycle of the PWM signal in response to the step of counting cycles of the periodic signal.

17. The method as recited in claim 10, further comprising the steps of:
(a) controlling the amount of current drawn by the windings from the supply voltage during a spin up mode of the disk drive in response to the current sense signal;
(b) sensing a voltage level of the supply voltage to generate a voltage sense signal during a steady state mode of the disk drive; and
(c) controlling the amount of current drawn by the windings from the supply voltage during the steady state mode of the disk drive in response to the voltage sense signal.

18. The method as recited in claim 17, wherein the step of controlling the amount of current drawn by the windings from the supply voltage during the steady state mode comprises the step of adjusting a duty cycle of the PWM signal in response to the voltage sense signal.

* * * * *